Aug. 7, 1962 R. C. HOWARD 3,048,185
VARIABLE INCREMENT PRESSURE REGULATOR
Filed Aug. 3, 1959
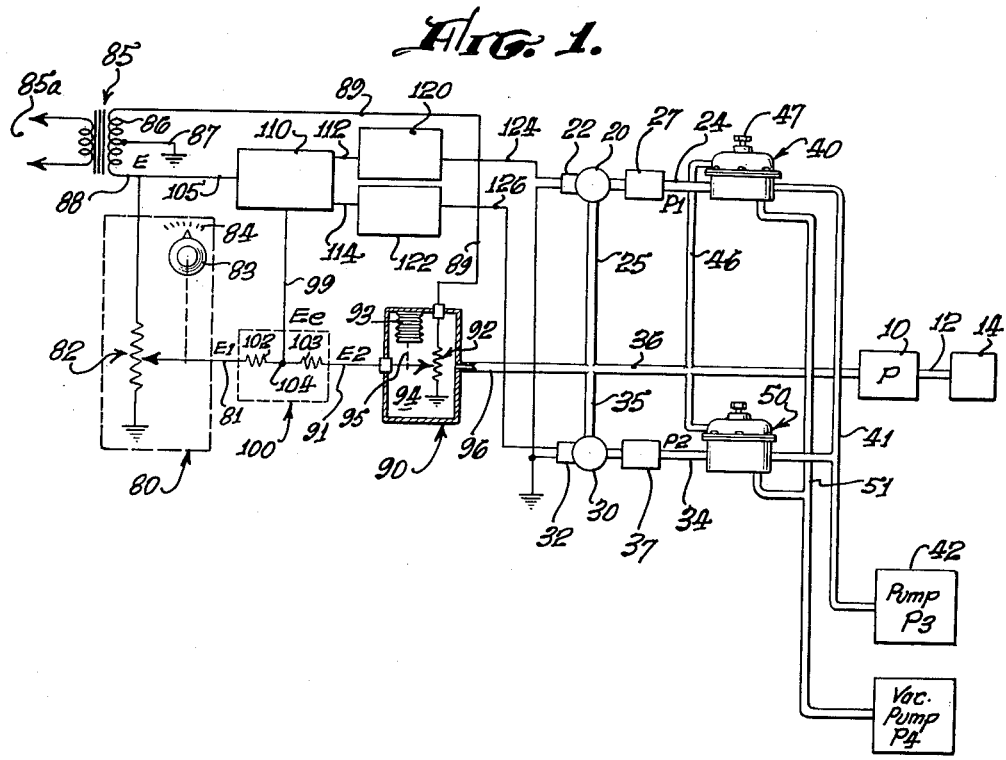
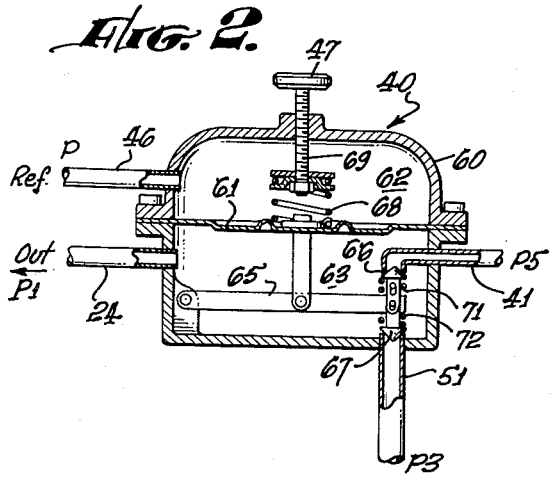
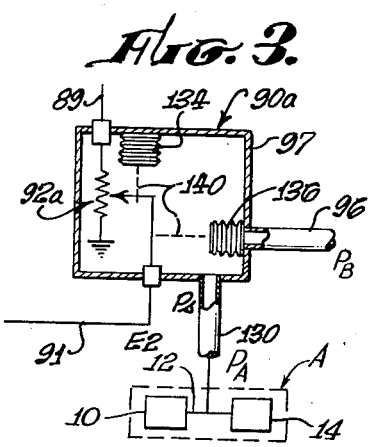
ROBERT CHARLES HOWARD,
INVENTOR.
BY
Batchelor + Lewis

United States Patent Office 3,048,185
Patented Aug. 7, 1962

3,048,185
VARIABLE INCREMENT PRESSURE REGULATOR
Robert Charles Howard, Costa Mesa, Calif., assignor to Giannini Controls Corporation, Pasadena, Calif., a corporation of New York
Filed Aug. 3, 1959, Ser. No. 831,197
4 Claims. (Cl. 137—103)

This invention is concerned generally with means for providing a source of gas pressure the value of which is controllable in an accurate and flexible manner.

The invention may typically produce pressure variations in response to one or more continuously variable control signals. By suitable variations of the control signal or signals, the resulting gas pressure may then be varied in any desired manner. The invention is particularly well adapted for producing such control of a gas pressure by a control signal that is not related linearly to the desired pressure, but is related to that pressure by an arbitrary functional relationship. By means of such control the gas pressure may conveniently be caused to simulate a wide variety of naturally occurring pressure phenomena.

As an illustrative example, the invention provides means by which the air pressures encountered during flight of an aircraft may be simulated accurately and relatively inexpensively on the ground. Thus, simulated static and total pressures may be developed and supplied to aircraft pressure instrument systems, accurately simulating the pressure conditions encountered in actual flight. Moreover, the pressure values supplied can conveniently be controlled in terms of a wide variety of command variables, such, for example, as the altitude and airspeed of the aircraft. Such pressure supply systems may be operated with a suitable computer to simulate complete aircraft performance including pneumatic parameters. The resulting simulation of predetermined flight patterns is useful for training and testing personnel, for checking performance of the instrument systems, and the like.

A particular advantage of the present invention is that it permits relatively rapid and accurate variation of gas pressure over a wide pressure range. Moreover, the control system of the invention is capable of varying the pressure at a rate that is a selected function of the pressure itself. In particular, the maximum rate of pressure variation may be made substantially directly proportional to the pressure P. That functional relation is especially desirable in simulating atmospheric pressures encountered by aircraft in flight. For example, the static pressure depends upon altitude in such a way that a given absolute change in altitude produces a substantially uniform fractional change in static pressure. Hence simulation of a given rate of climb at all altitudes requires production of a substantially uniform fractional rate of pressure change.

That and other advantages of the invention are accomplished by providing suitable sources of high and low pressure, respectively, which are connected to the gas chamber via respective control valves. The pressures supplied to the control valves are not constant, but are themselves caused to vary in response to the pressure actually present in the gas chamber. That control is such that one of the supply pressures exceeds the existing gas pressure by a predetermined and substantially constant pressure difference; and the other supply pressure is less than the existing gas pressure by a substantially constant pressure difference.

In accordance with a further aspect of the invention, the control valves are actuated in a periodic manner, typically in response to voltage pulses supplied to solenoids which actuate the valves. Those voltage pulses preferably have a definite duration and occur at a frequency not exceeding a predetermined value when the chamber pressure differs only slightly from the desired value. In response to increasing values of that pressure difference, the pulse duration and frequency may be variable, preferably in such a way that the valve remains open an increasing proportion of the time, until the appropriate valve is held full open.

When the rate of pressure change is desired to be proportional to the pressure, velocity limiting means such as capillary orifices are provided for insuring that the rate of flow through the valves is limited by flow of essentially laminar nature through the limiting orifices. For a given deviation of the actual pressure from the desired value, each cycle of valve operation then alters the chamber pressure by admitting or removing a definite volume of gas, substantially independently of the value of the pressure. Continuing periodic actuation of one of the valves at the described maximum cyclic frequency, or complete opening of the valve, then produces an effectively continuous pressure change at a rate that is substantially proportional to the existing pressure.

A full understanding of the invention, and of its further objects and advantages, will be had from the following description of certain illustrative manners in which it may be carried out. That description, of which the accompanying drawings form a part, is intended only as illustration, and not as a limitation upon the scope of the invention.

In the drawings:

FIG. 1 is a schematic diagram representing an illustrative embodiment of the invention for developing a pressure that represents atmospheric static pressure;

FIG. 2 is a schematic axial section representing an illustrative pressure regulating valve; and FIG. 3 is a fragmentary schematic diagram illustrating a modification for developing total or dynamic pressure.

Referring now to FIG. 1, the numeral 10 designates a gas-containing enclosure in which the pressure P is to be controlled in such a way as to represent the static pressure $P_s$ at a variable altitude in the atmosphere. The resulting gas pressure is supplied from chamber 10 via the delivery conduit 12 to any desired pressure utilizing device, represented schematically at 14. Device 14 may, for example, comprise the static pressure system of an aircraft.

The gas pressure P in chamber 10 is controlled via the two control valves 20 and 30, which are typically actuable by solenoid devices of conventional type, indicated at 22 and 32, respectively. Valves 20 and 30 are supplied on one side via the supply conduits 24 and 34 with respective gas pressures, $P_1$ and $P_2$, controlled in a manner to be described. The valves are connected on the other side via the conduits 25 and 35, respectively, to the common line 36 and via that line to chamber 10.

The rate of flow through valves 20 and 30 may be limited, if desired, by connecting relatively small, flow-limiting orifices in series with the supply or delivery conduits, as indicated schematically at 27 and 37, respectively. Orifices 27 and 37 are preferably connected closely adjacent their respective valves, and may be formed integrally therewith. They may be selected or designed in accordance with known flow characteristics or direct test to permit the desired rate of gas flow and dependence of flow rate on pressure during operation of the associated control valve.

The supply pressures $P_1$ and $P_2$ are developed under control of suitable pressure regulating valve mechanisms which are designated generally by the numerals 40 and 50, respectively. Those pressure regulating mechanisms are connected via the line 41 with a source 42 of relatively high pressure, $P_3$, which may comprise a power-driven compressor; and are connected via the line 51 with a source of relatively low pressure, $P_4$, such as a vacuum pump. Pressures $P_3$ and $P_4$ are preferably considerably higher and lower, respectively, than the corresponding limits of the desired range of variation of chamber pressure P. Thus, for example, if chamber pressure P is to simulate static pressure $P_s$ at an altitude that is variable from sea level to 60,000 feet, $P_3$ and $P_4$ may typically be about 25 p.s.i. absolute and and about 0.1 p.s.i. absolute, respectively.

Pressure regulating valve mechanisms 40 and 50 are shown illustratively as regulating valves of conventional type. The internal structure of those valves is shown for valve 40 in schematic and somewhat simplified form in FIG. 2. An airtight housing 60 is divided by a flexible diaphragm 61 into upper and lower chambers 62 and 63, respectively. The pressure P from chamber 10 is supplied by line 46 directly to upper chamber 62 as a reference pressure, and the output pressure $P_1$ or $P_2$ is taken from the valve via line 24 from lower chamber 63. Any pressure differential between reference and output pressures tends to deflect diaphragm 61. The diaphragm may also be yieldingly biased one way or the other by the coil spring 68. One end of spring 68 is connected to the center of the diaphragm and the other end is axially movable by the screw 69, threaded in the wall of housing 60 with sealing means of any suitable type, not specifically shown.

Deflection of diaphragm 61 controls the pivoted lever 65 and thereby the two valves 66 and 67. Those valves control flow between lower chamber 63 and the high and low pressure supply lines 41 and 51, respectively. When diaphragm 61 is in equilibrium position both valves are just substantially closed. The valves are mounted on lever 65 for limited resilient movement under light pressure of springs 71 and 72, respectively, movement of each valve permitting lever movement in a direction to open the other valve. Downward diaphragm deflection, as when output pressure is too low, closes valve 67 firmly and opens valve 66, admitting gas from line 41 and increasing the output pressure. Similarly, upward diaphragm deflection firmly closes valve 66 and opens valve 67, allowing gas to escape from chamber 63 to line 51, and reducing the output pressure. The valve action thus maintains the output pressure at such a value that it balances the sum of reference pressure P and any force exerted by spring 68 on the diaphragm. If that spring force, as adjusted manually, is downward with a valve corresponding to 1 p.s.i., for example, output pressure is maintained equal to $P+1$; and if the spring exerts an upward force of the same value, the output pressure is maintained equal to $P-1$.

The first of those adjustment conditions is typical for regulating mechanism 40, which thus supplies to solenoid valve 20 a pressure $P_1$ equal to slightly more than chamber pressure P; and the second condition is typical of regulating mechanism 50, which then supplies valve 30 with a pressure slightly less than chamber pressure P.

The regulating valves 40 and 50 may comprise more complex conventional structures than those described. For example, more accurate regulation may be accomplished by controlling one or both of the valves 66 and 67 by means of pilot valves, controlled in known manner by auxiliary diaphragms. An illustrative structure of that type is sold by the Moore Products Company of Philadelphia under the trademark "Nullmatic." The quality of regulation can also be increased by providing auxiliary regulating means for controlling the pressures at which the high and low pressure air is delivered to the regulating valves from supply lines 41 and 51. Those auxiliary regulators may, for example, be of the same general construction as primary regulators 40 and 50, and may derive their reference pressures from lines 24 and 34, respectively.

Actuation of control valves 20 and 30 is typically controlled in response to an input command signal. That command signal typically represents, in accordance with a predetermined functional relationship, some physical command variable with respect to which the pressure P is to be controlled. In the present illustrative instance, that command variable is the altitude of an aircraft; and the command signal is developed by means indicated generally at 80 and comprises an alternating current voltage $E_1$ of which the magnitude is directly proportional to the altitude to be simulated. The altitude command signal $E_1$ is typically developed at the brush of a potentiometer 82. The potentiometer winding is connected between ground and a source of reference voltage E, shown as the transformer 85 with its primary winding connected to a source of alternating current power indicated at 85a. Potentiometer 82 may be driven automatically in any desired manner to vary signal $E_1$; or may, for example, be set manually as by a knob 83 associated with a scale 84 that is calibrated directly in altitude in feet. The control system is arranged to produce in chamber 10 a pressure P that has some definite relationship to that command variable. In the present instance, that selected relation is the known relationship of the atmospheric static pressure $P_s$ to the altitude. The chamber pressure is then maintained equal to the static pressure at the command altitude.

For that purpose, a second electrical signal is developed on the line 91 under control of the pressure P actually existing in chamber 10, as by means indicated generally at 90. That signal, which will be called for convenience the comparison signal and designated $E_2$, is of the same type as command signal $E_1$, and is therefore an alternating current voltage in the present instance. That voltage $E_2$ is derived under control of the existing pressure P in such a way that it bears the same functional relation to P that command voltage $E_1$ bears to the static pressure $P_s$.

Comparison signal $E_2$ may be developed by a transducer of any suitable type, which may typically comprise a conventional transducer such as is employed on aircraft for developing a voltage signal proportional to static pressure. As shown, $E_2$ is developed at the brush of a potentiometer 92, the winding of which is connected between ground and a source of reference voltage having a definite phase relation to reference voltage E. As shown, the transformer 85 has the center of its secondary winding 86 grounded at 87. One end of the winding 86 then provides reference voltage E on line 88 and the other end provides a reference voltage of opposite phase for supply via line 89 to potentiometer 92. The brush of potentiometer 92 is driven under direct control of pressure P, as by an evacuated pressure responsive capsule 93 enclosed in a chamber 94 to which the pressure in main chamber 10 is supplied via the conduits 96 and 36. The winding of potentiometer 92, or the linkage indicated schematically at 95 between capsule 93 and the potentiometer brush, or both, are functioned in known manner in accordance with the known dependence of static pressure $P_s$ upon altitude. The comparison signal $E_2$ is then directly proportional to the altitude corresponding to the static pressure existing in chamber 10.

Command signal $E_1$ and comparison signal $E_2$ are supplied via lines 81 and 91, respectively, to a comparison device indicated schematically at 100. Comparator 100 typically comprises a resistive adding network formed by the resistors 102 and 103, series connected between lines 81 and 91. At the junction 104 of those resistors is developed an alternating current error signal $E_e$ of which the amplitude is proportional to the difference between voltages $E_1$ and $E_2$. The phase of $E_e$, measured with respect to the reference voltage E, depends upon the polarity of that voltage difference.

The alternating current error signal $E_e$ at junction 104 is supplied via line 99 to a phase sensitive detector of conventional type, indicated schematically at 110. Detector 110 has two output lines 112 and 114. Whenever the amplitude of the input error signal exceeds a selected critical value, detector 110 produces an output signal voltage on line 112 or 114, depending upon the phase relation between the error signal, and the reference phase E, received via line 105. The output signal is typically proportional to the amplitude of the error signal $E_e$.

Lines 112 and 114 are connected to respective pulsing mechanisms 120 and 122, which may be of any suitable type. Each pulsing mechanism may, for example, comprise a mono-stable multivibrator which is tripped whenever the input signal exceeds a definite threshold value, and which then returns to stable condition after a uniform predetermined time interval. The pulser may then be said to include a timing mechanism for determining a definite frequency, and it supplies output voltage pulses at that frequency in response to any input signal. It is preferred, however, to arrange the multivibrator in known manner so that its period in the unstable state decreases progressively as the input signal amplitude increases. The resulting voltage pulses then become more closely spaced and finally typically merge into a steady voltage output when the input signal exceeds a definite critical value. The pulsing mechanisms ordinarily include means of known type for amplifying and shaping the output pulses, which are delivered on lines 124 and 126, respectively.

Those lines are connected to the operating solenoids 22 and 32, respectively, of the control valves 20 and 30. The connections are such that, when the error signal $E_e$ corresponds to a pressure P less than $P_s$, actuating pulses are delivered to valve 20; and when P exceeds $P_s$ actuating pulses are delivered to valve 30.

As a result of each pulse actuation of one of the control valves 20 or 30, a definite amount of air is added to, or removed from, chamber 10. That produces a pressure readjustment throughout the pneumatic system, which is typically completed in a small fraction of a second. The pressure in transducer 90 is changed correspondingly, causing a slight movement of the brush of potentiometer 92 and a corresponding change in the electrical comparison signal $E_2$ on line 91. That signal change tends to bring $E_2$ closer to $E_1$, reducing the error signal $E_e$ supplied to detector 110. The valve actuating pulses continue at the frequency determined by the pulsing mechanism until the error signal becomes less than the threshold value to which detector 110 responds.

The time constants of the pulsing mechanisms are so selected that the period between pulses, at values of the input signal just exceeding the critical value, exceeds the time required for the pneumatic and electrical system to reach a new equilibrium following momentary operation of one of the control valves. A period of approximately 0.1 second is typically satisfactory for that purpose. The control system may then be said to determine whether or not to deliver each valve actuating pulse on the basis of the pressure and signal magnitudes resulting after completion of the preceding pulse. With that arrangement, the system delivers a continuing series of spaced pulses until the chamber pressure P is so close to the desired value $P_s$ that the error signal $E_e$ is less than the threshold value. The system then remains at rest as long as the balanced condition continues.

To prevent overshoot as such balance is approached, it is desirable that the threshold value of the error signal be properly related to the increment in the comparison signal $E_2$ that results from a single pulse actuation of a control valve. In general, the error signal threshold should lie between 0.5 and 1 times the described increment in $E_2$. Stated the other way around, the increment in signal $E_2$ produced by each valve actuation should lie between two and one times the error signal threshold, or between 1 and 0.5 times the width of the servo dead band that extends between the positive and negative thresholds. A single pressure pulse then cannot move the pressure level across the dead band, as would be necessary to cause overshoot. The sensitivity of the system, which is the smallest pressure deviation $\Delta P$ that the system will recognize and correct, then substantially corresponds to the pressure change produced by one valve pulsation.

It is ordinarily desirable that a substantially uniform volume of air pass the control valves during each pulse actuation, regardless of the chamber pressure. The increment of pressure per pulse is then a constant fraction of the existing pressure. That relation also tends to make the sensitivity of control of pressure approximately proportional to the pressure itself so that the ratio $\Delta P/P$ is substantially constant throughout the range of control.

The air volume per pulse can be maintained substantially constant in the present system by insuring that the flow rate is limited by flow of laminar form. For that purpose, orifices 27 and 37 are so designed as to limit the flow rate during each pulse and to be of substantially capillary form. Each orifice may, for example, comprise a tube having a length at least ten times its internal diameter and having a sectional area no larger than about one quarter the area of the open valve.

Transducer 90 may, if desired, be positioned remotely from the rest of the control system. For example, delivery line 12 is sometimes quite long, and it is then advantageous to position transducer 90 close to the pressure utilizing apparatus 14 and to supply pressure to it from line 12 rather than from line 36 as in FIG. 1. Electrical connections 89 and 91 are then correspondingly lengthened. An advantage of that arrangement is that pressure control is exercised on the basis of the pressure at the delivery end of line 12, and any moderate leakage or obstruction in that line does not affect the accuracy of effective control.

It will be understood that many of the specific components of the described combination system can be replaced by known alternative structures that provide essentially the same functions. For example, pulsing mechanisms 120 and 122 may represent known forms of blocking oscillator for pulse generation, rather than the multivibrators that have been described. Also, representation of the pulsing mechanisms and detector 110 in FIG. 1 by separate symbols does not imply that they are necessarily separate and distinct structures.

Transducer 90 is illustrative of means for developing a comparison signal that has any desired functional relation to the chamber pressure P. That functional relation may, for example, involve other variables in addition to the primary command variable and the pressure to be simulated by P. For example, it may be desired that the chamber pressure P vary in such a way that its ratio to a second pressure represents a predetermined function. That function may then be considered as a primary command variable, and the second pressure may be considered as an auxiliary command variable. In particular, the primary command variable, which is represented by command signal $E_1$, may be Mach number, rather than altitude as in the described system; and the chamber pressure P may be desired to simulate the total pressure $P_t$ that corresponds to that Mach number and to some definite value of altitude. The altitude value may then be considered as an auxiliary command variable controlling the static pressure. For that purpose, transducer 90 may be replaced by a transducer 90a which is essentially a conventional Machmeter, as represented schematically in FIG. 3. The comparison signal on line 91 will then typically comprise an electrical signal proportional to the Mach number that corresponds to a total pressure input and a static pressure input. The total pressure input to the Machmeter is typically supplied via line 96 directly from chamber 10 (FIG. 1); and the static pressure input to the Machmeter can be derived from any suitable source and supplied via the line 130 to transducer 90a.

Transducer 90a typically comprises a housing 97 forming a chamber 94a which is in free communication with the static pressure supply in line 130. Within chamber 94a are mounted an evacuated static pressure capsule 134 and a differential pressure capsule 136, both exposed exteriorly to static pressure in the chamber. The interior of capsule 136 is supplied with total pressure from line 96, and the capsule response is therefore proportional to the differential pressure. A potentiometer 92a has its winding connected between ground and the source of reference voltage on line 89, thus corresponding generally to potentiometer 92 of FIG. 1. The brush of potentiometer 92a is connected to line 91 and is driven by joint action of the two capsules 134 and 136 via any suitable type of linkage mechanism which produces brush movement proportional to the value of Mach number corresponding to the input static and total pressures. That linkage mechanism may be of conventional type, and is represented schematically by the dashed lines 140 in FIG. 3.

With transducer 92a substituted for 92 of FIG. 1, the comparison signal on line 91 represents Mach number. A primary command signal $E_1$ representing the desired value of Mach number may be supplied on line 81 by suitably designed mechanism of the type represented at 80 in FIG. 1, scale 84 being then correspondingly calibrated. The static pressure input to line 130 (FIG. 3) may be derived in any suitable manner. For example, an auxiliary pressure control system may be provided. The overall system then comprises two systems A and B, say of which A is typically the system of FIG. 1, while B is modified as shown fragmentarily in FIG. 3. System A responds to a command signal representing altitude, and produces a pressure $P_A$ equal to static pressure at the command altitude. Pressure $P_A$ is supplied from line 12 of system A as input static pressure to conduit 130 of system B. System B responds to that static pressure and also to a primary command signal representing Mach number; and produces a pressure $P_B$ equal to the total pressure that corresponds to the command value of Mach number and to the static pressure $P_A$. The altitude input signal to auxiliary system A may then be considered as an auxiliary command signal for the overall combined system, supplementing the primary Mach number command signal supplied to system B.

In operation of such a modified overall system, comparison device 100 compares the command signal and comparison signal, as previously described, causing the pressure P in chamber 10 to be automatically varied until the two signals are substantially equal. However, in the present modified embodiment, those signals represent Mach number and the pressure P represents total pressure. The overall action is therefore to develop a pressure P equal to the total pressure that corresponds to a primary command signal representing Mach number and an auxiliary command signal representing altitude.

I claim:

1. A system for developing in a chamber a gas pressure which has a predetermined relationship to a continuously variable electrical input command signal, said system comprising:

means adapted to be connected to a chamber containing a body of gas under a variable pressure and responsive to the variable gas pressure and acting to produce an electrical comparison signal to which the existing gas pressure has the said relationship, means for receiving an input command signal, means for comparing said comparison signal with the command signal and developing a control signal corresponding to their difference, first and second conduit means having connections adapted to connect with said variable gas pressure, first and second gas pressure regulating means responsive to the variable gas pressure and acting to provide the respective conduit means with pressures that differ from the variable pressure by approximately equal amounts in opposite directions, first and second valve means connected in series with the respective conduit means between the connections and the pressure regulating means, and means for actuating the valve means selectively under control of the of the control signal to effect a return of the variable pressure to a value as determined by the command signal.

2. A system for developing in a chamber a gas pressure substantially equal to the atmospheric static pressure that corresponds to a variable altitude, said system comprising:

means for developing an electrical command signal proportional to said altitude, means adapted to be connected to a chamber containing a body of gas under a variable pressure and responsive to the gas pressure and acting to produce an electrical comparison signal proportional to the altitude at which the static atmospheric pressure is equal to that gas pressure, means for comparing said comparison signal with the command signal and developing a control signal corresponding to their difference, first and second conduit means having connections adapted to connect with said variable gas pressure, first and second gas pressure regulating means responsive to the variable gas pressure and acting to provide the respective conduit means with pressures that differ from the variable pressure by approximately equal amounts and in opposite directions, first and second valve means connected in series with the respective conduit means between the connections and the pressure regulating means, and means for actuating a selected one of the valve means under control of the control signal to effect a return of the variable pressure to a value as determined by the command signal.

3. A system for developing in a chamber a gas pressure substantially equal to the dynamic pressure that corresponds to a variable value of Mach number and a variable altitude, said system comprising:

means for developing an auxiliary pressure equal to the static pressure at said altitude, means for developing an electrical command signal proportional to said value of Mach number, means adapted to be connected to a chamber containing a body of gas under a variable pressure and responsive to the auxiliary pressure and to the variable gas pressure and acting to develop an electrical comparison signal proportional to the Mach number that corresponds to those pressures as static and dynamic pressures, respectively, means for comparing said comparison signal with the command signal and developing a control signal corresponding to their difference, a source of pressure higher than the variable pressure, a source of pressure lower than the variable pressure, first and second conduit means adapted to connect with said variable gas pressure, first and second valve means connected between the pressure sources and the respective conduit means, and means for actuating a selected one of the valve means under control of the control signal to effect a return of the chamber pressure to a value as determined by the command signal.

4. A system for causing the gas pressure in a chamber to vary in accordance with an input command signal and at a rate that is substantially proportional to the pressure existing therein, said system comprising:

two conduit means adapted to communicate with a chamber containing a variable gas pressure, valve means connected in each of the conduit means,
structure forming a flow limiting orifice of substantially capillary form connected in each conduit means in series with the valve means therein,
means for maintaining across the valve means and orifice of each conduit means a pressure differential having a value that is substantially uniform and independent of variations in pressure, said pressure differentials being oppositely directed,
and means adapted to receive an input command signal and also actuable under joint control thereby and by the variable pressure to operate a selected one of the valve means to effect the return of the variable pressure to a value as determined by the input command signal.

References Cited in the file of this patent

UNITED STATES PATENTS

| | | |
|---|---|---|
| 1,555,849 | Ingram | Oct. 6, 1925 |
| 1,869,791 | Wright | Aug. 2, 1932 |
| 2,881,375 | Kennedy | Apr. 7, 1959 |